United States Patent
Lee et al.

[11] Patent Number: 5,901,013
[45] Date of Patent: May 4, 1999

[54] FLUID SPINDLE BEARING VENT

[75] Inventors: Chen-hsiung Lee, San Jose; Holavanahally S. Nagaraj; Neal Bertram Schirle, both of Morgan Hill, all of Calif.

[73] Assignee: International Business Machines Corporation, Armonk, N.Y.

[21] Appl. No.: 08/909,994

[22] Filed: Aug. 11, 1997

[51] Int. Cl.$^6$ .............................. G11B 17/02; F16C 17/10
[52] U.S. Cl. ........................................ 360/99.08; 384/112
[58] Field of Search ............................... 310/90, 42, 67 R, 310/43, 91, 156; 384/112–114, 123, 292, 425, 427, 428; 360/98.07, 99.04, 99.08

[56] References Cited

U.S. PATENT DOCUMENTS

| | | | |
|---|---|---|---|
| 4,557,610 | 12/1985 | Asada et al. | 384/107 |
| 4,696,585 | 9/1987 | Swearingen | 384/399 |
| 5,018,881 | 5/1991 | Asada | 384/113 |
| 5,112,141 | 5/1992 | Asada et al. | 384/100 |
| 5,120,139 | 6/1992 | Asada et al. | 384/107 |
| 5,323,076 | 6/1994 | Hajec | 310/90 |
| 5,357,163 | 10/1994 | Minakuchi et al. | 310/90 |
| 5,524,986 | 6/1996 | Leuthold et al. | 384/119 |
| 5,533,811 | 7/1996 | Polch et al. | 384/107 |

FOREIGN PATENT DOCUMENTS

| | | |
|---|---|---|
| 63-103639 | 5/1988 | Japan . |
| 2-286907 | 11/1990 | Japan . |
| 3-14906 | 1/1991 | Japan . |
| 3-260415 | 11/1991 | Japan . |
| 4-341607 | 11/1992 | Japan . |
| 6-137321 | 5/1994 | Japan . |
| 8-303475 | 11/1996 | Japan . |

*Primary Examiner*—Brian E. Miller
*Attorney, Agent, or Firm*—John H. Holcombe

[57] ABSTRACT

A vent is disclosed for a screw mounted support shaft of a fluid dynamic bearing for a spindle of a magnetic disk file. The support shaft for mounting a spindle bushing has an axial hollow center internally threaded at one end, and has upper and lower bearing journals for rotatably mounting the spindle bushing with a fluid lubricant. The bearing journals are separated by a recess having a vent passage between the recess and hollow center. A screw is threaded through the base plate or cover into the threaded end of the support shaft, mounting the support shaft to the base plate or cover. An air vent passage, such as a slit is provided axially either in the threaded end of the hollow center of the support shaft or in the screw, and radially across the end of the support shaft so the air bleed passage extends from the hollow center externally of the support shaft.

26 Claims, 4 Drawing Sheets

FLUID SPINDLE BEARING VENT

FIELD OF THE INVENTION

This invention relates to fluid dynamic bearings suitable for high speed rotating spindles for magnetic disk files, and, more particularly, to a fluid dynamic bearing having a vent.

BACKGROUND OF THE INVENTION

Magnetic disk files provide primary data storage systems for computer systems. The data is recorded in concentric tracks of a magnetic disk in the form of magnetic transitions. The disks are mounted on a spindle and the information is accessed by an actuator which moves a magnetic transducer radially over the surface of the disk and aligns the transducer with the concentric tracks. The disk and spindle are mounted for rotation on a support shaft and the disks are rotated at high speeds by means of an electric motor.

Important requirements for magnetic disk files are quick access to data together with high data rates. A key to both is a high rotational speed. On average, it takes half a revolution of the disk for the desired data to reach the transducer after the actuator has positioned the transducer at the desired track. Thus, the higher the speed the disk rotates, the quicker the desired data can be accessed. Similarly, faster rotation of a disk causes more data to pass the transducer, increasing the data rate at the transducer.

Fluid dynamic bearings may be used to achieve faster rotation speeds. In these systems, a lubricating fluid, such as oil, functions as the actual bearing surface between the stationary support shaft and the rotating spindle.

Typically, the lubricating fluid is maintained in the bearing areas by means of surface tension seals and a careful balance between the surface tension of the lubricant, the relative pressures of the air and the lubricant, and the size and structure of the clearances at the edges of the bearings.

For magnetic disk drive spindles, two fluid dynamic bearings are typically required with one at the top and one at the bottom of the spindle, respectively The bearings are held in place by surface tension, but are sometimes subject to rupturing by entrapped air and are therefore vented to avoid rupturing the oil film. The entrapped air can occur in low pressure and/or high temperature conditions. When the support shaft for the spindle is hollow and is press fitted into a hole in a disk file base plate, the entrapped air then vented out through the press fit hole in the base plate.

Referring to FIG. 1, an example of the described fluid dynamic spindle bearing 10 of the prior art is illustrated with two journal bearings 12 and 14. A spindle bushing 16 is mounted on a support shaft 16 with a small clearance. The small clearance is filled with a fluid lubricant, such as oil, through which fluid dynamic pressure is generated as the spindle bushing is rotated. The lubricating fluid is maintained in the bearing journals 12 and 14 by means of surface tension seals employing a careful balance between the surface tension of the lubricant, the relative pressures of the air and the lubricant, and the size and structure of the clearances at the edges of the bearings.

Two fluid dynamic bearings 12 and 14 are employed toward the top and bottom of the magnetic disk drive spindle, respectively. A recess 20 is provided defining or separating the bearing journals 12 and 14. The illustrated bearings 12 and 14 are normally coupled. If coupled, the bearings are sometimes decoupled by entrapped air, risking rupturing the oil film surface tension seals. The rupturing can occur due to expansion of the entrapped air due to low external ambient pressure and/or high temperature conditions. The bearings 12 and 14 may include a venting hole to the hollow center opening 23 in the support shaft 18 to reduce the likelihood of rupturing the oil film surface tension.

Alternatively, the bearings may be initially decoupled, forming surface tension seals at the top and bottom of each bearing 12 and 14. In the case of decoupled bearings, air is already present between the two radial bearings, but sometimes additional air can be entrapped during assembly or oil charging or even during operation. Thus, venting is often necessary to avoid rupturing the oil film. The venting hole 22 is therefore provided to vent the entrapped air through the hollow center opening 23 in the support shaft 18.

The support shaft 18 is press fit into an opening in a base plate 25. The press fit provides an external vent for the center opening 23 of the support shaft. Press fitting of the support shaft into the press fit hole in the base plate can be an expensive arrangement requiring accurate machining of the hole.

A more easily manufacturable alternative may be a screw mount through a flat base plate into the bottom of the support shaft 18. Unfortunately, the venting function is impeded by the presence of the screw and the contact between support shaft 18 and base plate 25 even if venting hole 22 is provided. A hollow screw could be employed, but is not suitable from a cost perspective.

SUMMARY OF THE INVENTION

It is an object of the present invention to provide a fluid dynamic bearing that has a bearing support shaft mounted onto a base plate with screws allowing entrapped air to escape.

Disclosed is a vent for a screw mounted support shaft of a fluid dynamic bearing for a spindle of a magnetic disk file. The support shaft for mounting a spindle bushing has an axial hollow center internally threaded at one end, and has upper and lower bearing journals for rotatably mounting the spindle bushing with a fluid lubricant. The bearing journals are separated by a recess having a vent passage between the recess and hollow center A screw is threaded through the base plate into the threaded end of the support shaft, mounting the support shaft to the base plate. An air vent passage, such as a slit, is provided axially either in the threaded end of the hollow center of the support shaft or in the screw, and radially across the end of the support shaft so the air vent passage extends from the hollow center externally of the support shaft.

Other objects, features, and advantages of the present invention will be apparent from the accompanying drawings and from the detailed description below.

BRIEF DESCRIPTION OF THE DRAWINGS

The present invention is illustrated by way of example and not limitation in the figures by the accompanying drawings in which like references indicate similar elements and in which.

DETAILED DESCRIPTION OF THE INVENTION

Figure 1:
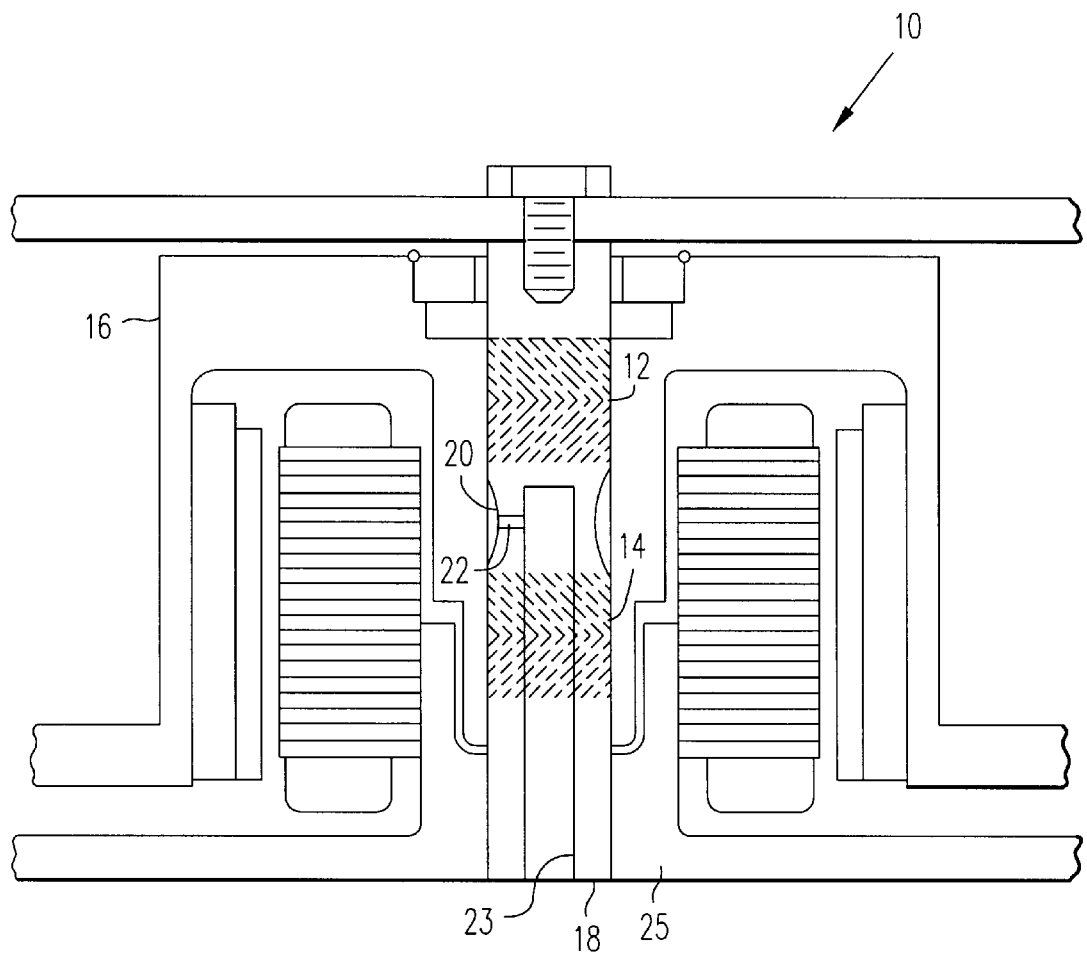
FIG. 1 is a diagrammatic sectional representation of a prior art fluid dynamic spindle bearing for a magnetic disk file.
Figure 2:
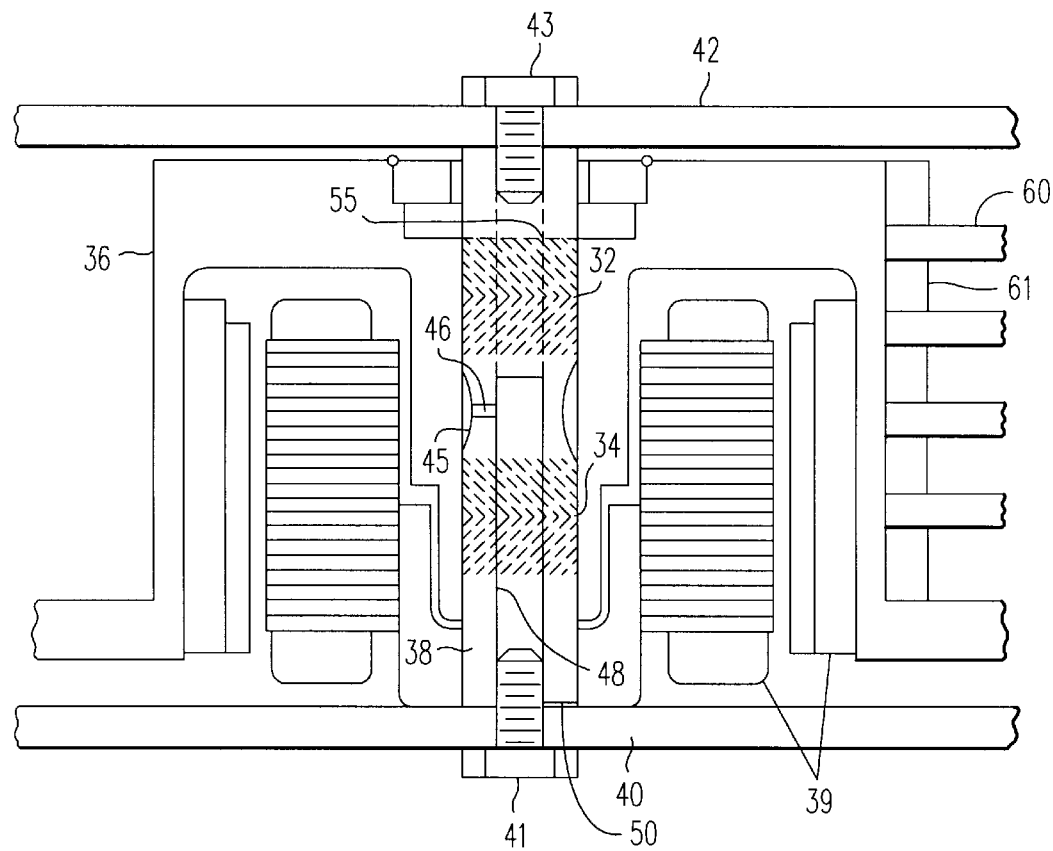
FIG. 2 is a diagrammatic sectional representation of an embodiment of a fluid dynamic spindle bearing of the present invention.

FIG. 2 illustrates an embodiment of the present invention which provides a vent for fluid dynamic bearings 32 and 34. A spindle bushing 36 is mounted on a support shaft 38 with a small clearance which is filled with a fluid lubricant, such as oil, through which fluid dynamic pressure is generated as the spindle bushing is rotated by a motor 39. The support shaft 38 is mounted to flat base plate 40 by a screw 41 extending through the base plate into a threaded end of the support shaft 38. The support shaft 38 is mounted to an internal top plate 42, called a "cover", by a second screw 43 extending through the cover 42 into a threaded end at the opposite end of support shaft 38.

A recess 45 is provided defining or separating the bearing journals 32 and 34. A venting hole 46 is provided to vent entrapped air to the hollow center opening 48 in the support shaft 38. The venting function may be impeded by the presence of the screw 41 and the contact between the support shaft 38 and the base plate 40.

Figure 3:
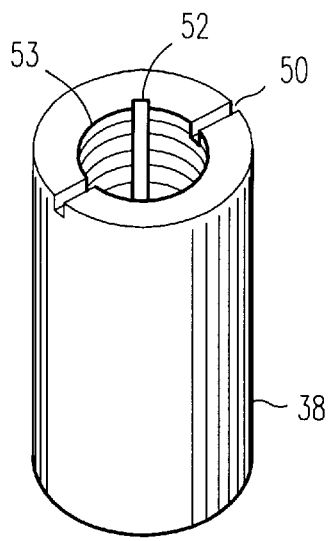
FIG. 3 is a perspective view of an embodiment of a support shaft of the fluid dynamic spindle of FIG. 2.

An embodiment of the present invention for venting the hollow center opening 48 is best illustrated by reference to FIGS. 2 and 3. A radial slit 50 and an axial slit 52 are provided in the support shaft 38. The radial slit 50 may extend radially across one side of the support shaft 38 or may extend radially across both sides of the support shaft. The depth of the radial slit can be in the order of a few hundred microns, and is preferably at least 100 microns.

However, the depth of the axial slit 52 on the thread 53 must be deeper than the maximum height of the tooth of the screw 41 in order to allow the air to pass the threads. The two slits 50 and 52 do not have to meet since the clearance between the screw 41 and the thread 53 will leave enough room for air to pass through.

As an alternative, in FIG. 2 the hollow center opening 48 may instead extend upwards as shown by dotted lines 55 to screw 43. The support shaft may then be vented through hollow center opening 55 to screw 43 at top cover 42.

Whether the bearings 32 and 34 are vented at the top cover 42 or at the bottom base plate 40, the preferred approach is to vent internal to the device enclosure or housing.

The vent of the present invention prevents pressure deltas across the bearing system that can occur with heating within the device enclosure during operation or with ambient pressure changes. The vent, or "breather hole" has a relatively low impedance to flow to achieve adequate venting.

Should a vent at screw 41 through base plate 40 or a vent at screw 43 through cover 42 provide higher impedance to flow than desired, vents may be provided at both ends of support shaft 38 at both screw 41 and screw 43.

Figure 4:
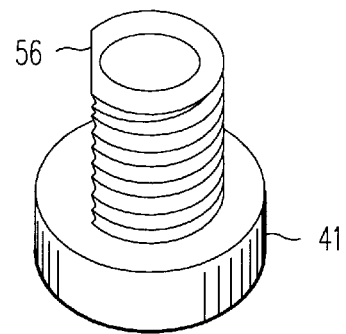
FIG. 4 is a perspective view of an embodiment of a screw for the fluid dynamic spindle of FIG. 2.

An alternative embodiment is illustrated in FIGS. 4 and 2. The radial slit 50 is provided in the support shaft 38 as before, and screw 41 is provided with a flat side 56. The flat side 56 must be deeper than the height of the threads 53 to leave enough clearance for the air to pass the threads. Again, the flat side 56 and the slit 50 do not have to meet since the clearance between the screw and the thread 53 will leave enough room for air to pass through.

Thus, the venting of recess 45 through opening 46 and hollow center 48 of support shaft 38 is accomplished by radial slit 50 and either slit 52 or flat side 56.

Figure 5:
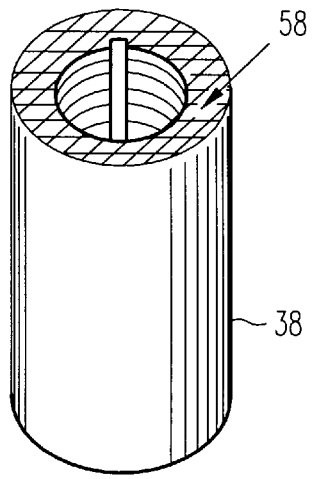
FIG. 5 is a perspective view of an alternative embodiment of a support shaft of the fluid dynamic spindle of FIG. 2.

Another alternative embodiment is illustrated in FIG. 5. Support shaft 38 may be textured by rough grinding or by machining so as to provide a textured surface 58. The textured surface 58 must have sufficient surface area that it may be supported perpendicular to the base plate or cover, and the texturing must extend from the interior of the support shaft 38 to the exterior to allow the air to be vented.

Referring to FIG. 2, the spindle bushing 36 supports a plurality of magnetic disks 60 separated by a plurality of separators 61, often referred to as "spacer rings." Motor 39 rotates the spindle bushing and thereby rotates the magnetic disks 60.

Figure 6:
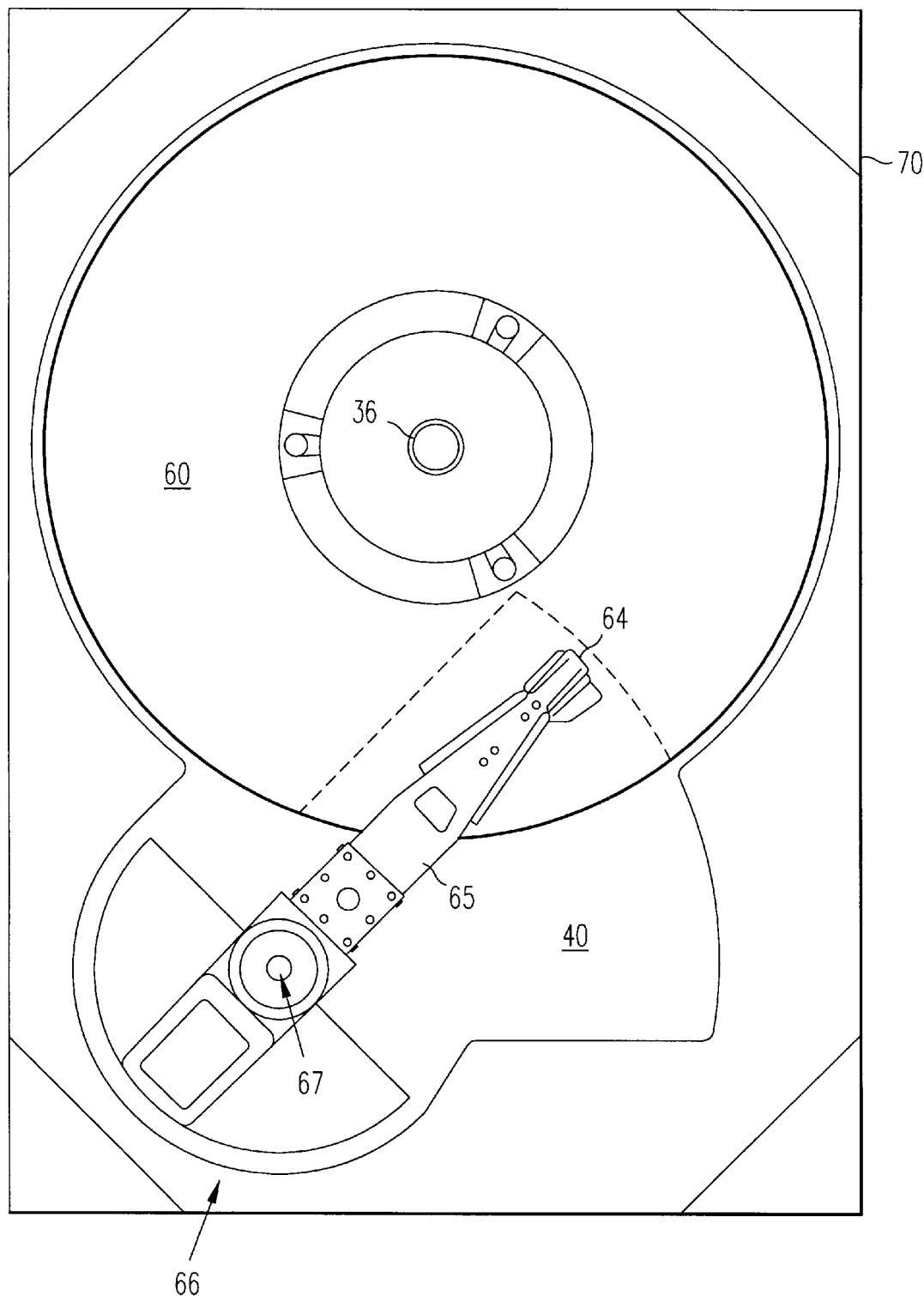
FIG. 6 is a top view representation of a magnetic disk drive employing the fluid dynamic spindle of FIG. 2.

FIG. 6 illustrates an example of a magnetic disk drive in which the invention may be employed. At least one magnetic disk 60 is mounted on the spindle bushing 36, having a plurality of concentric tracks for recording information. As the disks are rotated by the motor, a transducer 64 mounted on the end of an actuator arm 65 is selectively positioned by a voice coil motor 66 rotating about pivot axis 67 to move the transducer go from track to track over the surface of the disk. The elements of the disk drive are mounted on base plate 40 in a housing 70 which is typically sealed to prevent contamination. The disks 60 are mounted on spindle bushing 36 of FIG. 2 and rotated by motor 39 about support shaft 38 at a high rotational speed to generate fluid dynamic bearings 32 and 34. The recess 45 between the bearing journals is vented to hollow center opening 48 and/or opening 55. The venting of the support shaft in accordance with the invention is to the interior of housing 70 and not to the atmosphere external to the magnetic disk drive.

While the preferred embodiments of the present invention have been illustrated in detail, it should be apparent that modifications and adaptations to those embodiments may occur to one skilled in the art without departing from the scope of the present invention as set forth in the following claims.

We claim:

1. In a fluid dynamic spindle bearing comprising a base plate; a cover; a spindle bushing; and a support shaft having an axial hollow center internally threaded at least at one end, and having upper and lower bearing journals for rotatably mounting said spindle bushing with a fluid lubricant, said bearing journals separated by a recess having a vent passage between said recess and said hollow center; a mount and an air vent passage, the improvement comprising:

at least one screw extending through at least one of said base plate or said cover into said threaded end of said support shaft, mounting said support shaft to said base plate or said cover;

at least one axial air vent passage through said threads of said threaded end of said support shaft at the interface of said screw and said threaded end; and at least one radial air vent passage in said threaded end of said support shaft from said hollow center across said threaded end of said support shaft at the interface of said base plate or said cover and said threaded end, said axial air vent passage and said radial air vent passage interconnected to form an air vent passage extending from said hollow center along said interfaces externally of said support shaft.

2. The fluid dynamic spindle bearing of claim 1, wherein said at least one radial air vent passage comprises a radial slit from said hollow center across said threaded end of said support shaft.

3. The fluid dynamic spindle bearing of claim 1, wherein said at least one axial air vent passage comprises an axial slit through said threads of said threaded end of said support shaft.

4. The fluid dynamic spindle bearing of claim 3, wherein said axial slit is deeper than the height of said threads of said screw.

5. The fluid dynamic spindle bearing of claim 1, wherein said at least one axial air vent passage comprises an axial flat side on said screw.

6. The fluid dynamic spindle bearing of claim 5, wherein said screw axial flat is deeper than the height of said threads of said threaded end of said support shaft.

7. The fluid dynamic spindle bearing of claim 1 wherein said at least one radial air vent passage comprises a texturing at the end of said support shaft extending from said hollow center along a plurality of paths at said interface.

8. A fluid dynamic spindle bearing, comprising:
a base plate;
a spindle bushing;
a cover;
a support shaft having an axial hollow center internally threaded at one end, and having upper and lower bearing journals for rotatably mounting said spindle bushing with a fluid lubricant, said bearing journals separated by a recess having a vent passage between said recess and said hollow center;
at least one screw extending through at least one of said base plate or said cover into said threaded end of said support shaft, mounting said support shaft to said base plate or said cover;
at least one axial air vent passage through said threads of said threaded end of said support shaft at the interface of said screw and said threaded end; and
at least one radial air vent passage in said threaded end of said support shaft from said hollow center across said threaded end of said support shaft at the interface of said base plate or said cover and said threaded end, said axial air vent passage and said radial air vent passage interconnected to form an air vent passage extending from said hollow center along said interfaces externally of said support shaft.

9. The fluid dynamic spindle bearing of claim 8, wherein said at least one radial air vent passage comprises a radial slit from said hollow center across said threaded end of said support shaft.

10. The fluid dynamic spindle bearing of claim 8, wherein said at least one axial air vent passage comprises an axial slit through said threads of said threaded end of said support shaft.

11. The fluid dynamic spindle bearing of claim 10, wherein said axial slit is deeper than the height of said threads of said screw.

12. The fluid dynamic spindle bearing of claim 8, wherein said at least one axial air vent passage comprises an axial flat side on said screw.

13. The fluid dynamic spindle bearing of claim 12, wherein said screw axial flat is deeper than the height of said threads of said threaded end of said support shaft.

14. The fluid dynamic spindle bearing of claim 8, wherein said at least one radial air vent passage comprises a texturing at the end of said support shaft extending from said hollow center along a plurality of paths at said interface.

15. A magnetic disk file comprising:
(a) a base plate;
(b) a cover;
(c) a spindle supporting at least one magnetic disk and having an axial bushing, both about a central axis;
(d) a motor for rotating said spindle;
(e) an actuator supported by said base plate having at least one transducer for moving said transducer into read and\or write relationship with said disk;
(f) a support shaft having an axial hollow center internally threaded at one end, and having upper and lower bearing journals for rotatably mounting said spindle bushing with a fluid lubricant, said bearing journals separated by a recess having a vent passage between said recess and said hollow center;
(g) at least one screw extending through at least one of said base plate or said cover into said threaded end of said support shaft, mounting said support shaft to said base plate or said cover;
(h) at least one axial air vent passage through said threads of said threaded end of said support shaft at the interface of said screw and said threaded end; and
(i) at least one radial air vent passage in said threaded end of said support shaft from said hollow center across said threaded end of said support shaft at the interface of said base plate or said cover and said threaded end, said axial air vent passage and said radial air vent passage interconnected to form an air vent passage extending from said hollow center along said interfaces externally of said support shaft.

16. The magnetic disk file of claim 15, wherein said at least one radial air vent passage (i) comprises a radial slit from said hollow center across the end of said support shaft.

17. The magnetic disk file of claim 15, wherein said at least one axial air vent passage (h) comprises an axial slit through said threads of said threaded end of said support shaft.

18. The magnetic disk file of claim 17, wherein said axial slit is deeper than the height of said threads of said screw.

19. The magnetic disk file of claim 15, wherein said at least one axial air vent passage (h) comprises an axial flat side on said screw.

20. The magnetic disk file of claim 19, wherein said screw axial flat is deeper than the height of said threads of said threaded end of said support shaft.

21. The magnetic disk file of claim 16, wherein said radial slit is greater than 100 microns in depth.

22. The magnetic disk file of claim 15 wherein said at least one radial air vent passage (I) comprises a texturing at the end of said support shaft extending from said hollow center along a plurality of paths at said interface.

23. A support shaft for a fluid dynamic bearing for screw mounting to at least one plate, comprising:
upper and lower bearing journals for rotatably mounting a bushing with a fluid lubricant;
a recess separating said bearing journals;
an axial hollow center internally threaded at least at one end for said screw mounting;
a vent passage between said recess and said hollow center;
at least one axial air vent passage in said at least one internally threaded end of said support shaft through the threads; and
at least one radial air vent passage in said threaded end of said support shaft from said hollow center to an outer edge of said support shaft, said axial air vent passage and said radial air vent passage interconnected to form an air vent passage at said screw mounting for venting from said recess externally of said screw mounting.

24. The support shaft of claim 23, wherein said at least one radial air vent passage comprises a radial slit from said hollow center across the face of said internally threaded end.

25. The support shaft of claim 23, wherein said at least one axial air vent passage comprises an axial slit through said threads at said internally threaded end.

26. The support shaft of claim 23, wherein said at least one radial air vent passage comprises a texturing of the face of said internally threaded end extending from said hollow center to said outer edge.

* * * * *